United States Patent [19]

Cravotta

[11] Patent Number: 4,641,712
[45] Date of Patent: Feb. 10, 1987

[54] WEED CUTTER AND EXTRACTOR

[76] Inventor: Samuel A. Cravotta, 2341 N. Edgewood St., Arlington, Va. 22201

[21] Appl. No.: 690,585

[22] Filed: Jan. 11, 1985

[51] Int. Cl.⁴ .............................................. A01B 1/16
[52] U.S. Cl. .................................. 172/25; 294/50.6; 172/378
[58] Field of Search ............... 294/50.7, 50.6; 172/26, 172/25, 378; 30/300, 310; 173/30; 175/19, 20, 21; 408/124; 144/104, 108

[56] References Cited

U.S. PATENT DOCUMENTS

| | | | |
|---|---|---|---|
| 576,703 | 2/1897 | Tyson | 294/50.6 |
| 2,030,770 | 2/1936 | Smith | 172/22 |
| 2,439,524 | 4/1948 | Moore | 172/22 X |
| 2,583,214 | 1/1952 | Hanzlik | 294/50.7 |
| 2,680,643 | 6/1954 | Cravotta | 172/378 X |
| 3,198,719 | 8/1965 | Stewart | 172/378 X |
| 3,847,227 | 11/1974 | Myers | 172/25 |

FOREIGN PATENT DOCUMENTS

| | | | |
|---|---|---|---|
| 211366 | 3/1955 | Australia | 294/50.6 |
| 174287 | 3/1935 | Switzerland | 172/25 |

Primary Examiner—Richard J. Johnson
Attorney, Agent, or Firm—John B. Dickman, III

[57] ABSTRACT

A weed cutting and extracting tool having upper and lower portions, the lower portion having a weed cutting and pulling device attached thereto and a foot rest for applying pressure to said weed cutter, the upper portion of said tool being crank shaped so as to rotate said tool when in use.

2 Claims, 6 Drawing Figures

WEED CUTTER AND EXTRACTOR

BACKGROUND OF THE INVENTION

Weed extractors have been in use for many years, and have assumed various shapes and constructions, some very simple, as in Applicant's prior patent, U.S. Pat. No. 2,680,643 (copy enclosed), and others very complicated.

Applicant's prior patent was satisfactory, but was tiring to the user after a period of time, as the pressure needed to force the tool into the ground came entirely from the hands and arms. In addition, rotating the tool in the hands of the user could cause blisters, as the tool itself rubbed the hands.

In the improved tool shown herewith, the foot of the user is placed on the foot support to force the weed extractor end into the ground with a minimum of effort, and the rotating handles on the upper part of the tool insure that no abrasive action will occur between the tool and the hands of the user when the tool is rotated during use.

BRIEF DESCRIPTION OF THE DRAWINGS

FIG. 6 is a bottom view of the portion of the device shown in FIG. 5.

DESCRIPTION OF THE INVENTION

Figure 1:
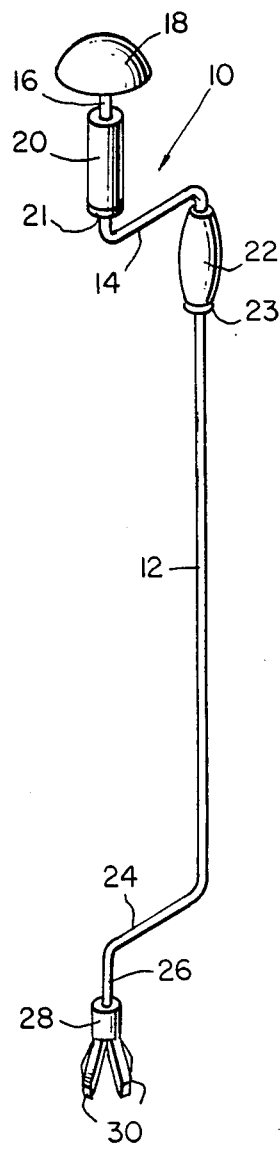
FIG. 1 is a perspective view of the preferred form of the invention.

Referring to the drawings in detail, specifically the form shown in FIG. 1, numeral 10 represents the device generally, having a main shaft body portion 12, an upper lever arm 14 formed at a right angle to the main body portion, an upper arm 16 bent upwards at a right angle to lever arm 14 and parallel with main body portion 12 and terminating at a rotatable hand rest 18. A rotatable grip 20 is formed or attached to the upper extension arm 16, and a second rotatable grip 22 is formed or attached to the main body portion 12. A fixed washer or other supporting means 21 holds the grip 20 in rotatable position on the main shaft body portion 12, and a fixed washer or other supporting means 23 holds the grip 22 in position on the body portion 12.

At the lower portion of main body portion 12 a foot rest or stirrup 24 is formed by a right angle bending of the main body portion, and a lower extension arm 26 is bent at right angles downwardly from the foot rest 24 and parallel to the main body portion 12. A weed extractor member 28, having tines 30, is rigidly attached to the lower end of the arm 26.

Figure 2:
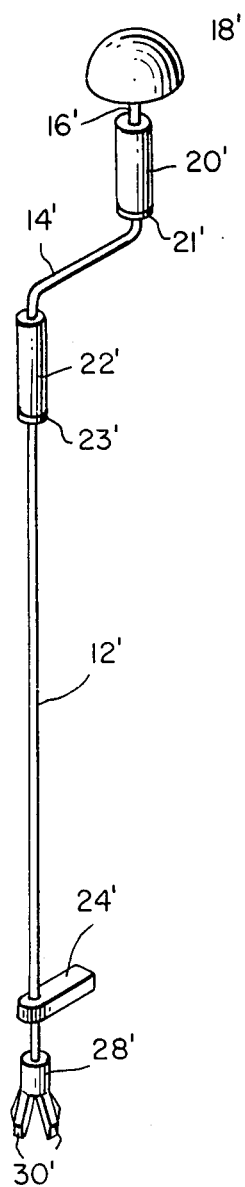
FIG. 2 is a perspective view of a slightly modified form of the invention.
Figure 3:
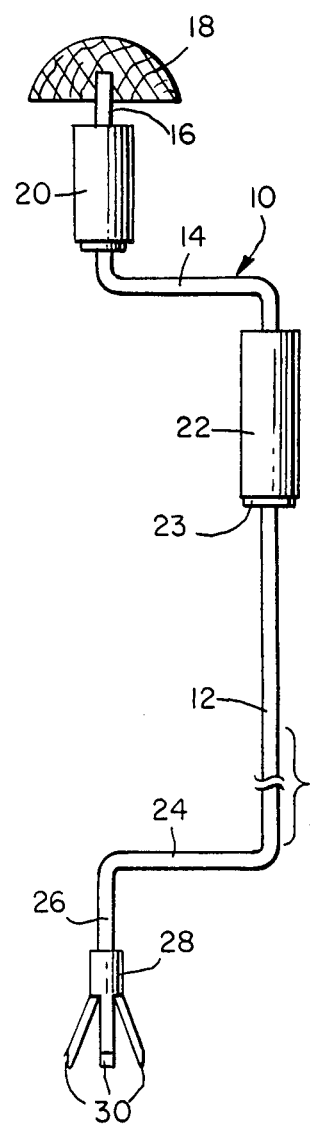
FIG. 3 is an enlarged elevational view of the device shown in FIG. 1.
Figure 5:
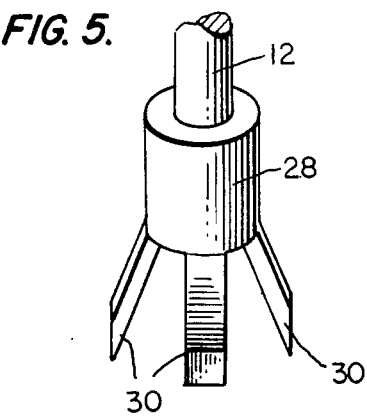
FIG. 5 is an enlarged view of a portion of the device shown in FIG. 3.
Figure 4:
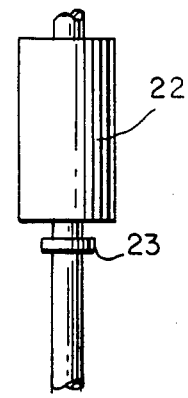
FIG. 4 is an enlarged view of a portion of the device shown in FIG. 3, showing a handle positioning washer.

In the modification shown in FIG. 2, the main body portion 12', upper lever arm 14', upper arm 16', hand rest 18', rotatable grips 20' and 21' and weed extractor 28' are substantially identical to the form shown in FIG. 1, the main difference being the foot rest 24', which is formed of a separate piece of metal or plastic and rigidly attached to the main body portion 12'.

In operation, the device is placed over a weed so that the stem of the weed is projecting upwardly through one of the openings between the tines of the weed extractor 28. The user then pushes downwardly with his foot on foot rest 24, pushing the extractor and tines into the ground and rotating the device by means of a cranking action with the hands on grips 20 and 22. This rotating action entangles the root of the weed in the tines of the extractor and pulls the weed out of the ground, the tines also acting to cut off any side branches of the weed. The whole device is then lifted up and the entangled root of the weed removed.

From the foregoing discussion it will be apparent that numerous modifications, substitutions, variations, changes and equivalents will now occur to those skilled in the art, all of which fall within the spirit and scope contemplated by the present invention. Accordingly, it is intended that the invention be limited only by the scope of the appended claims.

What is claimed is:

1. A weed extractor comprising an elongated main shaft having oppositely disposed ends, one of said ends having a weed extracting member rigidly attached thereto, said member comprising an enlarged cylindrical member secured to said shaft and being split longitudinally and bent to form a plurality of ground engaging tines diverging away from the longitudinal axis of said shaft forming V-shaped slots between each pair of adjacent tines, upper and lower lever arms integral with said shaft, said lever arms extending at right angles to said longitudinal axis of said main shaft, said upper lever arm having an upper extension arm extending vertically therefrom and at a right angle thereto, said upper extension arm being in parallel relationship to said elongated main shaft and supporting a rotatable hand rest and a rotatable hand grip thereon, said lower lever arm formed at a right angle to said elongated main shaft to form a foot rest portion, and having a depending right angled lower extension arm extending therefrom, said depending lower extension arm being coaxial with the upper extension arm and in parallel relationship with said elongated main shaft and having said rigidly attached weed extracting member at its lower end.

2. A weed extractor comprising an elongated main shaft having oppositely disposed ends, one of said ends being designated as the lower end, said lower end having a weed extracting member rigidly attached thereto, said member comprising an enlarged generally cylindrical member being split longitudinally and bent to form a plurality of ground engaging tines diverging away from the longitudinal axis of said shaft at its lower end to form V-shaped slots between each pair of adjacent tines, upper integral and lower lever arms on said shaft, said lever arms extending at right angles to said longitudinal axis of said main shaft, said upper lever arm having an upper extension arm extending vertically therefrom and at a right angle thereto, said upper extension arm being in parallel relationship with said elongated main shaft and supporting a rotatable hand rest and a rotatable hand grip thereon, said lower lever arm comprising a separate foot rest portion rigidly attached to said main shaft, said main elongated shaft portion below said foot rest having said rigidly attached weed extracting member thereon.

* * * * *